April 27, 1965     C. O. KREUTZER     3,180,047
IMPULSE GENERATING ELECTRICAL CIRCUIT FOR ELECTRICALLY
INFLUENCING LIVING CREATURES
Original Filed June 20, 1960
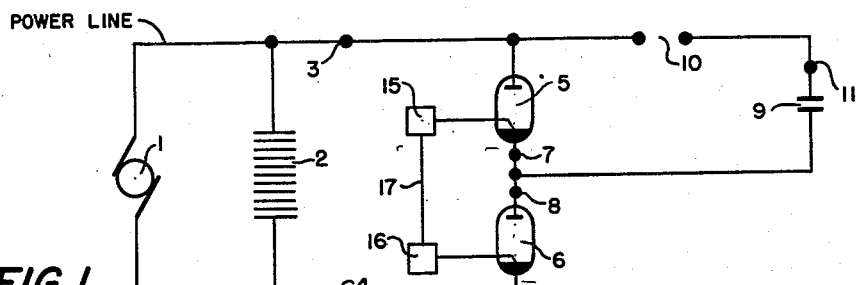
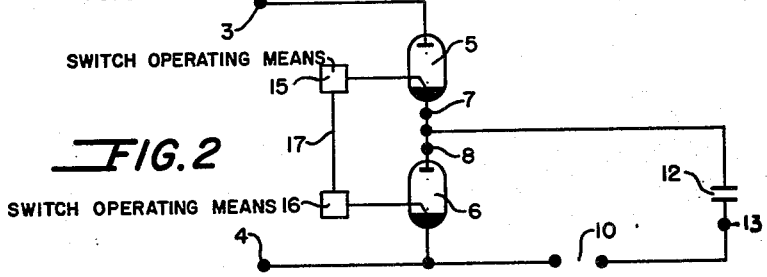
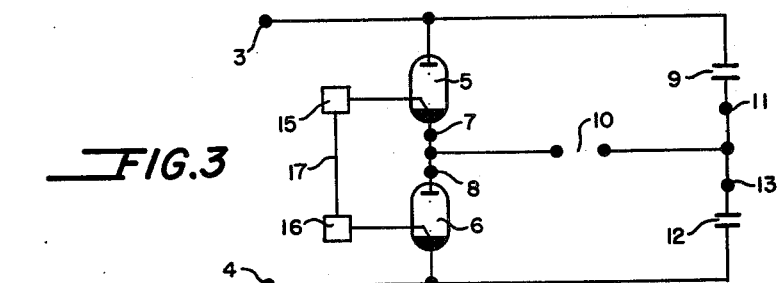
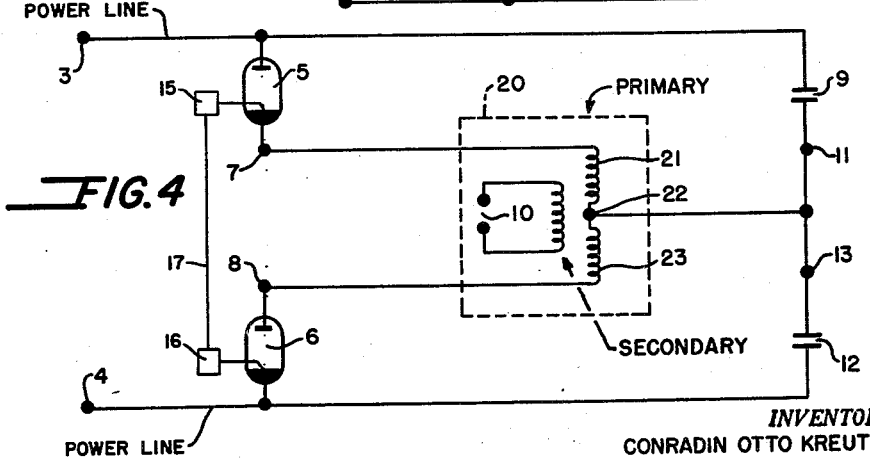
INVENTOR.
CONRADIN OTTO KREUTZER
BY Arthur H Robert
ATTORNEY

United States Patent Office 3,180,047
Patented Apr. 27, 1965

3,180,047
IMPULSE GENERATING ELECTRICAL CIRCUIT FOR ELECTRICALLY INFLUENCING LIVING CREATURES
Conradin O. Kreutzer, Lewes, Del., assignor to Smith Research and Development Company, Inc., Lewes, Del., a corporation of Delaware
Continuation of application Ser. No. 37,329, June 20, 1960. This application June 10, 1964, Ser. No. 375,419
4 Claims. (Cl. 43—17.1)

This is a continuation of my co-pending application Serial No. 37,329, filed June 20, 1960, now abandoned.

This invention relates to the art of electro influencing living creatures, which includes, among other things, the electro-fencing art wherein fish are "electrically" repelled from a given area by means of a bipolar current, i.e. by "electrifying" that area with an electrical current of alternately changing polarity such as sustained A.C. or impulse A.C., and the electro-fishing art wherein fish are "electrically" attracted toward an anode in a given area by "electrifying" that area with a unipolar current, i.e. an electrical current of unchanging polarity such as sustained D.C. or impulse D.C.

The principal object of the present invention is to provide a novel impulse current generating circuit of such simplified design that it is easy and inexpensive to manufacture, operate and maintain and is effective in operation.

In carrying out my invention, I serially interconnect first and second normally open switches and place them across the line of a D.C. source and I serially interconnect an impulse capacitor with the load (i.e., the operatively submerged impulse firing cathode and anode electrodes) and shunt them across the first normally open switch. With this arrangement, the first switch controls the closure of a discharge circuit for the capacitor while the second switch controls the closure of a charging circuit for said capacitor. Consequently by alternately closing these switches momentarily, a capacitor discharging impulse is first fired in one direction across the load and then a capacitor charging impulse is fired in the opposite direction across the load.

In further accordance with my invention, a second capacitor may be connected in series with the same load and shunted across the second switch. This addition establishes a second discharging circuit, which operates simultaneously with the first charging circuit, and a second charging circuit, which operates simultaneously with the first discharging circuit.

So far as the load is concerned, both of the foregoing arrangements may be described as the A.C. impulse or bipolar type since the direction of the flow across the load reverses with each successive closure of the two (alternately-closing) switches. However, in further accordance with my invention, each of the foregoing arrangements can be converted into the D.C. impulse or unipolar type simply by providing means for reversing the flow direction of every second impulse across the load. This may be readily accomplished by connecting the load across the secondary of a D.C. impulse transformer of the split primary type and by connecting the primary to cause all impulses of one polarity to flow through one-half of the split primary in one direction toward the split or common terminal and all impulses of opposite polarity to flow through the other half of the primary in the said one direction but away from the split terminal so that all secondary current impulses will flow in one given direction.

Embodiments of the invention are illustrated in the accompanying drawing wherein:

FIGS. 1-3 show circuits for generating and firing a succession of D.C. impulses in alternately changing directions across a load, these circuits including an impulse capacitor and the load connected across one switch in FIG. 1, across the other switch in FIG. 2 and across each switch in FIG. 3; and FIG. 4 shows the circuit of FIG. 3 converted to generate and fire a succession of D.C. impulses in the same direction across the load.

FIGS. 1-3

In FIG. 1, a D.C. source 1 charges a storage condenser 2, which may be of the dry or electrolytic types, and co-operates therewith to provide a source voltage across power line terminals 3 and 4. Now, in accordance with my invention, a pair of normally open switches are connected in series with each other between power line terminals 3 and 4 while an impulse capacitor and the load are connected in series with each other and shunted across one of the switches.

Thus, in FIG. 1, normally open switches 5 and 6 are connected in series with each other by connecting the common terminal 7 of switch 5 to the common terminal 8 of switch 6. These serially connected switches are placed across the power line by connecting the other terminal of switch 5 to power line terminal 3, and of switch 6 to power line terminal 4. Likewise, impulse capacitor 9 and the load 10 are connected in series and shunted across switch 5. The load 10 comprises a pair of spaced operatively-submerged electrodes.

In the operation of FIG. 1, the serially connected switches 5 and 6 are alternately closed for short periods in the rhythm of the desired impulse frequency. Thus, when switch 5 is momentarily closed, impulse capacitor 9 will immediately discharge through load 10 and switch 5 to provide an impulse flowing through the load 10 in one direction, say from right to left. Similarly, the closure of switch 6 establishes an impulse capacitor charging circuit through which the current flows from line terminal 3 through load 10, capacitor 9 and switch 6 to line terminal 4. It will be noted that the charging current flows through the load in one direction at spaced intervals while the discharging current flows through the load in the opposite direction at alternate intervals, i.e. intervals between said spaced intervals. Accordingly, if we alternate the momentary closure of switches 5 and 6 at a desired frequency, a succession of impulses of alternate polarity will be fired at that desired frequency.

The arrangement of FIG. 2 is the same as that of FIG. 1 except that an impulse capacitor 12 is connected in series with the load 10 and shunted across normally open switch 6, the impulse capacitor 9 being omitted. With this arrangement, the momentary closure of switch 5 establishes a charging circuit through which an impulse flows from terminal 3 successively through switch 5, capacitor 12 and load 10 to line terminal 4 while the momentary closure of switch 6 establishes a discharging circuit through which an impulse flows from capacitor 12 through switch 6 and load 10 back to capacitor 12.

The arrangement of FIG. 3 is nothing more than a combination of FIGS. 1 and 2 except that both circuits use the same identical load 10 which is now necessarily located between and connected to the switch interconnection (7, 8) on the one side and the impulse capacitor interconnection (11, 13) on the other side. It will, of course, be understood that the load 10 in FIGS. 1 and 2 can be shifted from the positions shown in each of those figures to the position shown in FIG. 3. In the FIG. 3 circuit, when capacitor 9 is discharged (or charged), capacitor 12 will be simultaneously charged (or discharged).

The circuit of FIG. 3 has several advantages over the circuits of FIGS. 1 and 2. In the first place, it does the work of both of those circuits although it differs from each of them only in that it has one additional capacitor. Another advantage is that each of its switches carries, when closed, one charging current and another discharging current whereas, in both of the FIG. 1 and 2 circuits, one switch carries one charging current while the alternate switch carries the other discharging current. A further advantage of the FIG. 3 circuit is that its efficiency is higher due to the fact that each of its impulses is composed of the combination of one charging and another discharging current. Thus, in the FIG. 3 circuit, if both pulse capacitors are of equal capacity and are charged to the same voltage, then each of its impulses will carry twice the current and have four times the power of any impulse in the FIGS. 1 and 2 circuits.

In the circuits of FIGS. 1–3, if the internal resistance of the direct current generator 1 is low, the storage condenser 2 can be omitted. Likewise if the power output of any circuit is small, mechanical switches may be used in place of switches 5 and 6. With larger power outputs, gas discharge tubes of the grid-controlled type, such as Thyratrons, or of the ignition-key-controlled type, such as Ignitrons, may be used. It will be understood that a current limiting resistor or choke may be required, in some cases, between the generator 1 and the storage-condenser 2.

In FIGS. 1–2, if the capacity of the storage condenser 2 is large in comparison with that of the impulse capacitor 9 (or 12), the length of the impulse, in one direction, will be determined by the time required to charge the impulse capacitor, and, in the opposite direction, by the time required to discharge the impulse capacitor. In FIG. 3, the impulse capacitors 9 and 12 preferably (but not necessarily) are of the same size or capacity. Here, since both capacitors 9 and 12 contribute to the impulse current flowing through the load during each firing operation, the pulse length is determined by the impulse capacitor of larger size; provided, of course, that the capacity of storage condenser 2 is large in relation to the capacity of the two impulse capacitors 9 and 12. In other words, if more time is required to charge capacitor 9 than is required to discharge capacitor 12, then the pulse length in that operation will be determined by the charging time of capacitor 9. The same considerations control in the reverse operation; hence, the pulse length in each of these cases will be determined by the longer of the charging and simultaneous discharging times involved.

In FIGS. 1–3, the load 10 preferably should be a pure ohmic resistance load but, if the area to be influenced has large physical dimensions, the load can have some inductance. If the load in FIGS. 1 and 2 has some inductance, then, because of that inductance, all pulses, positive and negative, change their shape and size, in comparison to the pulse of a pure ohmic circuit, and these changes are objectionable. This objection is substantially minimized if not entirely avoided, with the circuit of FIG. 3, because the change, in shape and size between ohmic circuit and inductive circuit pulses, occurs in such a way that the FIG. 3 pulses of one polarity are equal, in size and shape, to the FIG. 3 pulses of different polarity inasmuch as both have the same time constant. Before passing, it may be noted that the time constant is determined by the same load 10 in FIGS. 1–3, pulse capacitor 9 in FIG. 1 and 12 in FIG. 2, and the pulse capacitors 9 and 12 in FIG. 3.

In FIGS. 1–3 the switches 5 and 6 are alternately closed momentarily in repeated fashion at suitably spaced intervals corresponding to the pulse frequency. Since any suitable conventional switch operating means (of mechanical, electrical, or electro-mechanical character) may be employed for closing the switches, and since such means is normally (mechanically or electrically) interconnected, FIG. 1 indicates the operating means for switches 5 and 6 schematically at 15 and 16, respectively, and the interconnecting means therefor schematically at 17.

It will be understood that the apparatus of this invention (while generally suited for use in firing impulses through fresh water, which is of high electrical resistance, and primarily designed for use in firing impulses through sea water, which is of relatively low electrical resistance) may also be used specifically for charging an induction loop which is embedded in the ground as described and illustrated in U.S. Patent No. 2,818,672; subject, of course, to the pulse-changing effect of the load inductance in the circuit arrangements of FIGS. 1 and 2. The terminals for load 10, therefore, represents terminal connections adapted for connection to spaced submerged A.C. or D.C. current electrodes, or to an induction loop or to the other load means.

FIG. 4

To obtain pulses of the same polarity or same direction across the load, it is only necessary (*a*) to connect the load across the secondary of a D.C. impulse transformer of the split primary type and (*b*) to connect the split primary in a manner such as to cause the impulses of one polarity to flow in one direction through one-half of the split primary and impulses of the opposite polarity to flow in the same one direction through the other half of the primary so that the secondary current will always flow in a given direction.

Accordingly, in FIG. 4, I provide a D.C. impulse transformer 20 for the connections in FIG. 3, between both switches and both impulse capacitors. The secondary of this impulse transformer is connected to the load 10. The primary of this transformer serially interconnects the switches 5 and 6. This primary is split and provided with three terminals, viz: two line terminals 21 and 23; and an interposed center terminal 22. One line terminal 21 is connected to the interconnection terminal 7 of switch 5; the other line terminal 23 is connected to the interconnection terminal 8 of switch 6; and the interposed or center terminal 22 is connected to the capacitor interconnection 11, 13. The direct switch interconnection 7, 8 is omitted so that terminal 7 is connected to the capacitor interconnection 11, 13 through that one-half of the split primary which extends between terminals 21 and 22. Similarly, the interconnection terminal 8 or switch 6 is connected to the capacitor interconnection 11, 13 through the other half of the split primary which extends between terminals 22 and 23.

It should now be obvious that the closure of switch 5 will cause the discharging impulse from capacitor 9 and the charging impulse for capacitor 12 to pass simultaneously downward through the upper half of the primary winding of D.C. impulse transformer 20. Likewise the closure of switch 6 will cause the charging impulse for capacitor 9 and the discharging impulse for capacitor 12 to pass simultaneously downward through the lower half of the split primary. Since all pulses thus pass downwardly through the primary of transformer 20, all transformed pulses in the secondary will flow in the same direction.

D.C. impulse transformers 20 are quite similar to those used in radar equipment. In such transformers, the distortionless transformation of a D.C. pulse requires the inductance-over-resistance time constant "opposing"

the rapid buildup of a disturbing magnetic field in the transformer to be large and the corresponding time constant "opposing" the rapid rise of secondary current to be small. The main inductivity should be so high that the magnetising current is less than 1/10 of the primary current while the leakage inductivity should be so small that the secondary pulse has the same shape as the primary pulse. (See Fisher's 1958 Leipzig edition of "Radartechnik"; also Reuben Lee's "Electronic Transformers And Circuits," published by John Wiley & Sons in 1947.) Radar impulse transformers are smaller than my impulse transformers because radar transformers are designed for mico-second impulses whereas my transformers are designed for milli-second impulses. It should, therefore, suffice to say that the shape of each pulse entering the primary is an "e" function having a half value time of 0.3 milli-second, this being the regular shape of a pulse created by discharging a condenser through an ohmic resistor. When a D.C. pulse of this character is discharged through either half of the primary winding of transformer 20, a secondary D.C. pulse of substantially the same shape will be created in the secondary winding. If the primary pulse has a peak voltage of 3,000 volts and a peak current of 1,000 amps and if the transformer has a step-down ratio of 4 to 1, then the secondary pulse will have a peak voltage of 750 volts and a peak current of 4,000 amps.

Summary

From the foregoing it will be appreciated that my impulse current generating circuit is an extremely simple design, one obviously easy and inexpensive to manufacture, operate and maintain. In summary, the basic elements (common to all of my arrangements, when stated in terms primarily applying to FIG. 1) comprise: (a) first and second normally open switches 5 and 6 connected in series across D.C. power lines and, more particularly, across line terminals 3 and 4, the central portion of this serial connection extending from terminal 7 to 8 in FIG. 1; (b) an impulse capacitor 9; (c) output means adapted for connection to a load means 10, the output means of FIG. 1 including line terminals leading to the operatively submerged electrodes comprising the load means 10; (d) first connection means (1) connecting said first impulse capacitor 9 and said electro-fishing output means with each other and (a) not only with said first normally-open switch 5 to form a first normally-open capacitor-discharging circuit (b) but also with said second normally-open switch 6 to form a first normally-open capacitor-charging circuit extending across said line terminals 3 and 4, and (2) operative, (a) upon the closure of said first switch 5, to discharge said first capacitor 9 through said output means and thereby energize said output means with a first D.C. "discharge" impulse, and (b) upon the alternate closure of said second switch 6, to charge said first capacitor 9 through said output means and thereby energize said output means with a first D.C. "charge" impulse; and (e) operating means 15–17 for closing one switch while the other is open and vice versa.

To the foregoing basic arrangement, FIG. 2 adds nothing whereas FIG. 3 adds: a second capacitor 12 and a second connection means (1) connecting said second impulse capacitor 12 and said electro-fishing output means with each other and (a) not only with said second normally-open switch 6 to form a second normally-open capacitor-discharging circuit (b) but also with said first normally-open switch 5 to form a second normally-open capacitor-charging circuit extending across said line terminals 3 and 4, and (2) operative, (a) upon said closure of said first switch 5, to charge said second capacitor 12 through said output means and thereby energize said output means with a second D.C. "charge" impulse, and (b) upon said alternate closure of said second switch 6, to discharge said second capacitor 12 through said output means and thereby energize said output means with a second D.C. "discharge" impulse.

FIG. 4 adds the impulse transformer to the output means of FIG. 3, interposes the primary winding of that transformer serially between switches 5 and 6 and modifies the connection means so that it interconnects each of the two impulse capacitors through one side of the split primary with one switch, to form one pair of simultaneously operating capacitor discharging and charging circuits which cause one composite impulse to be fired in one direction through the load means, and through the other side of the split primary with the other switch, to form the other pair of simultaneously operating capacitor discharging and charging circuits which cause the opposite composite impulse to be fired in the same direction through the load means.

Having described my invention, I claim:

1. An electro-fishing apparatus for flowing impulse current between operatively submerged electrodes, comprising:
 (A) a pair of power lines adapted for connection to a source of power;
 (B) first and second normally-open switches connected in series with each other and placed across said power lines;
 (C) an impulse capacitor;
 (D) output means adapted for electrical connection to said operatively submerged electrodes, and operative, when so connected and energized with an electrical impulse, to cause a corresponding impulse to flow between said operatively submerged electrodes; and
 (E) circuit means for alternately charging and discharging said capacitor and for contemporaneously energizing said output means, said circuit means operating in response to the alternate closure of said switches and including
  (1) a normally-open charging circuit
   (a) extending from one of said power lines to the other, and
   (b) containing said impulse capacitor, said output means and one of said normally-open switches all connected in series, and
  (2) a normally-open discharging circuit
   (a) extending from one of said power lines back to the same one of said power lines, and
   (b) containing the other of said normally-open switches, said output means and said impulse capacitor all connected in series.

2. The apparatus of claim 1 including:
 (A) means for alternately operating said switches
  (1) to close said one switch at the beginning, and open it at the end, of the charging operation of said capacitor, and
  (2) to close said other switch at the beginning, and open it at the end, of the discharging operation of said capacitor.

3. The apparatus of claim 1 including:
 (A) a second impulse capacitor; and
 (B) second circuit means for alternately charging and discharging said second capacitor and for contemporaneously energizing said output means, said second circuit means operating in response to the alternate closure of said switches and including
  (1) a second normally-open charging circuit
   (a) extending from one of said power lines to the other, and
   (b) containing said second impulse capacitor, said output means and one of said normally-open switches all connected in series, and
  (2) a second normally-open discharging circuit
   (a) extending from one of said power lines back to the same one of said power lines, and (b) containing the other of said normally-open switches, said output means and said second impulse capacitor all connected in series.
4. The apparatus of claim 3 including:
(A) means for alternately operating said switches
 (1) to close one switch at the beginning, and open it at the end, of the charging operation of said first capacitor and the discharging operation of said second capacitor, and
 (2) to close said other switch at the beginning, and open it at the end, of the discharging operation of said first capacitor and the charging operation of said second capacitor.

References Cited by the Examiner
UNITED STATES PATENTS

| | | | |
|---|---|---|---|
| 1,992,908 | 2/35 | Cockroft et al. | 307—150 |
| 2,294,863 | 9/42 | Hadfield | 307—108 |
| 2,319,215 | 5/43 | Dawson | 307—108 |
| 2,836,735 | 3/54 | Krentzer | 307—110 |

ABRAHAM G. STONE, *Primary Examiner.*

F. RAY CHAPPELL, *Examiner.*